June 23, 1959 L. G. HALL ET AL 2,891,630
CHROMATOGRAPHY
Filed April 30, 1956
2 Sheets—Sheet 1

INVENTORS
LAWRENCE G. HALL
LELAND G. COLE
BY
Christie, Parker & Hale
ATTORNEYS

United States Patent Office 2,891,630
Patented June 23, 1959

2,891,630

CHROMATOGRAPHY

Lawrence G. Hall, West Covina, and Leland G. Cole, Santa Ana, Calif., assignors to Consolidated Electrodynamics Corporation, Pasadena, Calif., a corporation of California Application April 30, 1956, Serial No. 581,519

11 Claims. (Cl. 183—2)

This invention relates to chromatography and particularly to a method and to apparatus for continuous gas chromatography.

"Gas chromatography" or "vapor phase chromatography" are terms which properly may be applied either to adsorption or to gas-liquid partition chromatography. In adsorption chromatography a column containing appropriate adsorbent, usually in granular form, is used to separate the various constituents of a gas sample or of a liquid sample introduced into the column in vaporous or gaseous state. The sample is generally introduced to the column in a carrier gas stream which flows through the column during the entire process. Under proper conditions, various components of the gas sample are spatially separated by a process of selective adsorption and desorption, closely analogous to the mechanism of frictional distillation, so that the constituents are stratified in the column and continued flow of carrier gas causes ejection of the constituents from the column in sequential order. This order is a function of the relative volatility, molecular weight or structure, or other property affecting the relative adsorption of the constituents on the adsorbent column. Conventionally, as the separated gases or vapors emerge they are passed through a suitable detector element which senses a characteristic property of the eluted gas or vapor, such as thermal conductivity or density, to indicate the presence of and the amount of the several constituents thereof.

The essential feature of gas-liquid partition chromatography is the provision in the chromatographic column of an extensive liquid surface over which the gas is caused to flow intimately. Normally this is accomplished by distending the desired liquid in static condition as a very thin film over the matrix provided by the large exposed surface of an inert support. When a sample to be analyzed is passed through a column of this type in gaseous state and in company with a suitable elutant or carrier gas, the continuous solution and evaporation which takes place along the column makes it again in effect a fractionating operation in which certain components of the sample are carried more rapidly through the column than others. It is almost conventional in gas-liquid partition chromatography to pass the gaseous effluent from the column through a suitable detector to sense the presence and quantity of the separated constituents.

The packings most commonly used in chromatographic columns at the present time are activated carbon, alumina, silica gel, and in the case of gas-liquid partition chromatography a high boiling liquid disposed on a relatively inert support such as diatomaceous earth, ceramic beads or ceramic disks. The various liquids presently in use for this purpose include dioctyl phthalate, dinonyl phthalate, silicone fluids, tricresyl phosphate, dibutyl phthalate, and the like. Either normally liquid or normally gaseous materials may be sampled and analyzed in either adsorption or gas-liquid partition chromatography. In the event a liquid sample is involved it is vaporized and carried through the column as a vapor.

The present techniques for analysis by chromatography are generally limited to a dosing or periodic batch method of sample introduction. For many purposes such a process monitoring and commercial or laboratory bulk separation of constituents of a sample for the preparation of pure compounds, continuous chromatographic separation is needed. Some developments have been made in the past to this end, but to date these have been relatively complex. We have now discovered simple procedures and apparatus for continuous chromatographic analysis and bulk separation of sample constituents.

The invention involves a continuous process for separating at least one component from a sample mixture chromatographically in which the term "separating" is used to imply either selective sensing of the existence of such component without physical recovery thereof or actual bulk separation of such component from the sample. The process comprises introducing the sample in gaseous state in a restricted area of the surface of an annular bed of chromatographic packing. Simultaneously a carrier gas is introduced into the entire annular surface of the bed and the space velocity of the carrier gas is established above that at which any substantial lateral flow of the sample can take place within the bed. The annular bed and the point of sample introduction thereto are continuously rotated relative to each other, which objective can obviously be achieved either by causing rotation of the bed in relation to a fixed point of sample introduction, rotation of a sample inlet means relative to a fixed bed, or rotation of both at different rates.

The consequence of this relationship between the area of sample introduction and the space velocity of diluent or elutant flow is the appearance in the gas stream issuing from a similar restricted area at the opposite end of the chromatographic bed of the component of interest substantially free of contamination by other constituents of the sample. The area of emergence of a particular component from the annular bed bears a fixed angular relationship to the area of introduction which is a function of dimensions of the system and other operating parameters as well as the nature of the specific component. As the component of interest emerges from the bed, its presence in the carrier stream is sensed, as may be accomplished by conventional means such as a thermal conductivity cell, density balance, mass spectrometer or the like.

If bulk separation is desired, the component and the carrier gas in which it is diffused are collected, it being a very simple matter to select a carrier gas easily separable from the component of interest as by refrigeration, selective extraction, or the like.

Our invention also involves apparatus for carrying out the process as described, and refinements on such apparatus, leading toward an increased efficiency of the process. The apparatus may comprise a cylindrical housing, and an inner tube of smaller diameter mounted concentrically within the housing to form an annular chamber therein. The inner tube is sealed at opposite ends to prevent gas flow therethrough, and the annular chamber formed between the housing and the inner tube is filled with suitable packing material to form an annular chromatographic bed. A sample inlet enters the housing terminating in an outlet of restricted area disposed closely adjacent the annular upper surface of the packing bed. Means are provided for introducing an elutant gas into the housing for entry into the entire surface of the annular bed, the capacity of the elutant introducing means being such as to permit a space velocity above that necessary to prevent lateral diffusion of the sample as it travels longitudinally into and through the bed. A collecting means is adjustably positioned adjacent the opposite end of the bed and is provided with means for fixing and maintaining the angular relation of the collecting means and the sample inlet. This collecting means may comprise simply a detector through which the gas emerging from the bed in the area thereof travels to permit sensing of the component of interest, or it may comprise a collecting system for actual bulk recovery of a selected part of the gas emerging from the bed. The apparatus is also provided with means for effecting continuous relative rotation between the housing on one hand and the sample inlet and collector means on the other, the latter as above mentioned being adapted to be fixed relative to each other.

Preferably the collector is mounted to permit relative rotation thereof relative to the sample inlet so that the spectrum of emergent gases or vapors from the annular bed may be scanned. The detector may be adjusted to a desired position by initial scanning and then be fixed in that position relative to the inlet to continuously sense on a given constituent.

A refinement of the apparatus as described above particularly suitable for high resolution and for relatively large scale bulk separation involves a housing having closure means at opposite ends and, in this instance, a plurality of inner tubes of differing diameters mounted concentrically within the housing to form a plurality of annular chambers of varying diameter with the innermost tube being sealed to prevent gas flow therethrough. Chromatographic packing material is disposed in each of the chambers and is conveniently held therein by perforate closure means mounted across the outlet of the several inner tubes. Separate sample inlet means are carried through one closure and positioned to respectively introduce sample material to restricted areas of the annular surface of each of the several chambers, and means are provided for introducing elutant to the same closure to flow simultaneously into the entire annular surface of each of the several annular beds. The elutant introduction means is of such capacity as to permit introduction of elutant at a space velocity above that necessary to limit sample diffusion between the several inlet points and lateral diffusion of the several samples within the respective annular beds.

Separate collecting means are adjustably mounted at the opposite ends of each of the annular beds and may be maintained at fixed angular displacement relative to the respective sample introduction means. Means are again provided to develop relative rotation between the annular beds and the sample introduction means. Also, the separate collectors are preferably mounted to permit scanning the spectrum of the respective columns to permit accurate placement of the collectors.

A principal advantage of this embodiment is the ability to accomplish multi-stage chromatographic separation by interconnecting the collecting means of the several chambers with the sample inlet means, so that the effluent collected from one chamber may be reintroduced as the sample to another chamber. This provision is highly desirable where large scale bulk separation is needed and a very pure product is required and in separations requiring sequential fractionation with different matrices. To this end a relatively large initial sample may be introduced conveniently to the largest of the beds and a crude separation there effected to produce at the respective collector a fraction of the original sample containing the component of interest. By recycling this fraction to another of the beds, which may be provided with the same or different packing, it can be further purified and again recycled as necessary to produce the final desired product. To obtain the maximum efficiency from such recycling operation, separators are provided in the recycle system to recover the collected fraction from the elutant inevitably simultaneously collected.

One typical example of the use of such a system is in hydrocarbon separations and in which case the elutant selected may be nitrogen, steam, air or helium. In such event the separators employed in the recycle manifold for recovering the sample fraction from the elutant may be refrigeration traps whereby the sample fraction is liquefied and the elutant is withdrawn therefrom as a gas or immiscible liquid. The thus liquefied fraction is thereafter vaporized for recycle to the column as required. Continuous separation of gases of widely different character by refrigeration traps and other means is old in the art and, apart from its application in combination with the described chromatographic processes, forms no part of the present invention.

The invention will be clearly understood from the following description of apparatus embodiments thereof taken in conjunction with the accompanying drawing in which.

Figure 1:
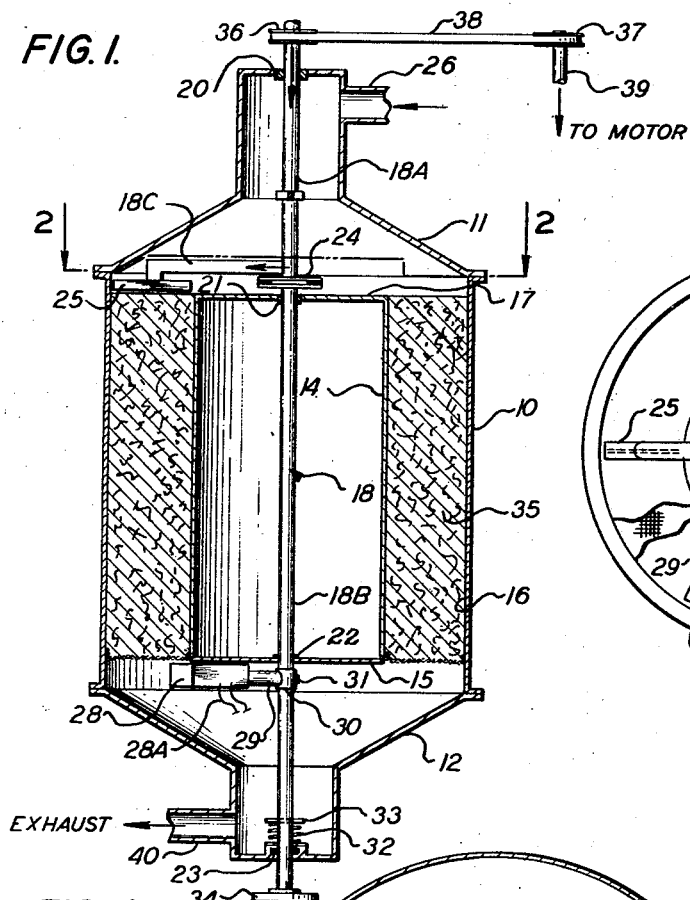
Fig. 1 is a vertical sectional elevation through a single chamber system in accordance with the invention.
Figure 2:
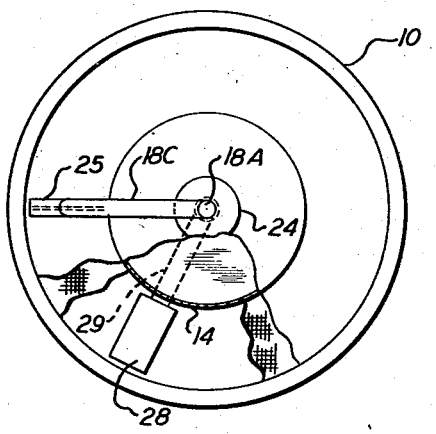
Fig. 2 is a horizontal section taken on the line 2—2 of Fig. 1.

The apparatus shown in Fig. 1 comprises a cylindrical housing 10 having opposite removable end closures 11 and 12 which are preferably shaped to reduce turbulence in the gas flowing therethrough. The illustrated conical closures constitute suitable shape for accomplishing this objective. An inner tube 14 is mounted coaxially within the housing 10 and is supported on a plate 15 welded across the bottom end of the housing. The inner tube forms an annular chamber 16 within the housing. The plate 15 is imperforate across the bottom of the inner tube 14 and is perforate across the bottom of the annular chamber 16 to permit gas flow therethrough. A closure 17 is disposed across the upper end of the inner tube so that the inner tube is sealed to prevent gas from bypassing chamber 16.

A shaft 18 is journaled through the upper closure at 11 through the plate 17, through the plate 15 and through the lower closure 12 at bearings 20, 21, 22 and 23 respectively. The shaft 18 consists of two sections 18A and 18B interconnected through a simple friction disk clutch 24. The upper section 18A is conveniently tubular and supports a communicating radial side leg 18C. The leg terminates at its outer end at a downwardly directed nozzle 25. This nozzle may be elongated radially to introduce sample feed into a maximum effective area of the column. An inlet nipple 26 for carrier gas opens into the upper closure.

Collecting means 28 is supported from the lower end of shaft 18 by a radially extending arm 29 connected to the shaft by a sleeve 30 conveniently held on the shaft by a set screw 31. The collector may take the form of a detector such as a thermal conductivity cell through which a gas may be passed without retention to sense the appearance of a particular component therein. Electrical leads 28A may be connected to the detector in conventional fashion to permit its rotation within the housing. The lower end 18B of the shaft is spring-loaded by means of a spring 32 compressed between bearing 23 and a plate 33 fixed to the shaft. This holds the shaft section 18B engaged to section 18A through clutch 24 but permits disengagement of the two sections by exerting a pull on a knob 34 mounted on shaft section 18B exteriorly of the housing. This permits rotation of the collector relative to the inlet.

The annular chamber 16 is charged with a suitable packing material 35 which may be any of the types mentioned above or any other packing suitable for the particular form of chromatography involved, it being apparent that the present invention is not concerned with any particular type of packing.

As previously explained, it is necessary for carrying out a continuous operation that the chromatographic bed and the sample inlet be rotated relative to each other in order that a given component of the sample will be selectively and continuously separated therefrom and will emerge with accompanying carrier gas at a point at the bottom of the bed angularly fixed with respect to the sample inlet. Conveniently, in the apparatus as illustrated, relative rotation is accomplished by rotating the shaft 18 as by means of pulleys 36, 37, belt 38 and a drive motor (not shown) connected to drive shaft 39 of the pulley 37. Rotation of the shaft 18 with clutch 24 engaged effects simultaneous and coordinate rotation of the sample inlet 25 and the detector 28 so that they remain in fixed angular relation with respect to each other even while rotating with respect to the stationary bed 34. To sense different components of the sample the detector may be readjusted to a different angular position with respect to the sample inlet. To sense more than one component at a time, two or more angularly spaced detectors may be employed simultaneously.

In the illustrated apparatus, gas passing through the detector as well as that issuing from the remainder of the bed is exhausted from the housing through an exhaust line 40. The exhaust line may be connected to a suitable exhaust pump (not shown) or vented, depending upon the means selected to achieve the required pressure drop across the column. Alternatively, the detector supporting arm 29 and that portion of shaft section 18B lying below the arm may be tubular so that that portion of the emergent gas passing through the detector may be separately recovered and collected.

In operation, carrier gas flow is established through the column at the desired space velocity to insure against substantial lateral diffusion of the sample. Flow of sample gas or vapor through shaft section 18A and nozzle 25 is thereupon initiated while the shaft 18 is being rotated within the stationary housing. After equilibrium is established the detector is positioned to sense on the component of interest. This is conveniently accomplished by disengaging the clutch and allowing the detector to remain motionless to sweep the spectrum of the system. When the desired phase relation between sample inlet and detector is thus determined, their relative angular positions are sustained by allowing the clutch to re-engage. If subsequently a different constituent is to be sensed or collected, the spectrum may be reexamined to properly locate the detector.

The independent support of the detector permits an accelerated scan of the entire spectrum by rotating the detector about the annular column at a rate in excess of the rate of rotation of the inlet. Thus, the inlet is rotated at a rate to complete one revolution in the time required for passage of the sample through the column. The detector, on the other hand, may sweep the column at a considerably accelerated pace.

Figure 4:
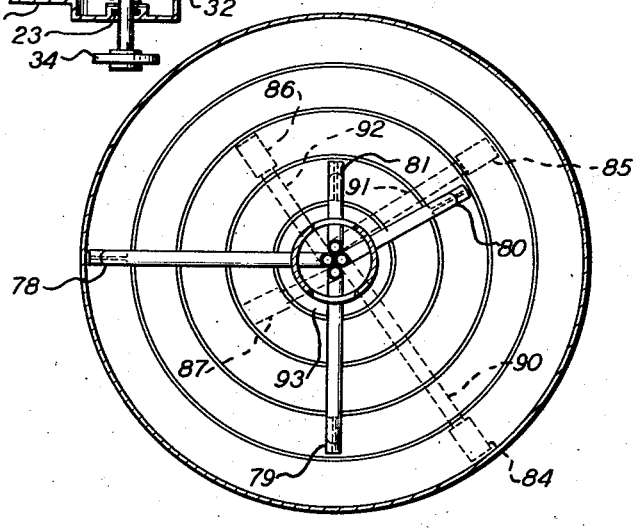
Fig. 4 is a horizontal section taken on the line 4—4 of Fig. 3.
Figure 3:
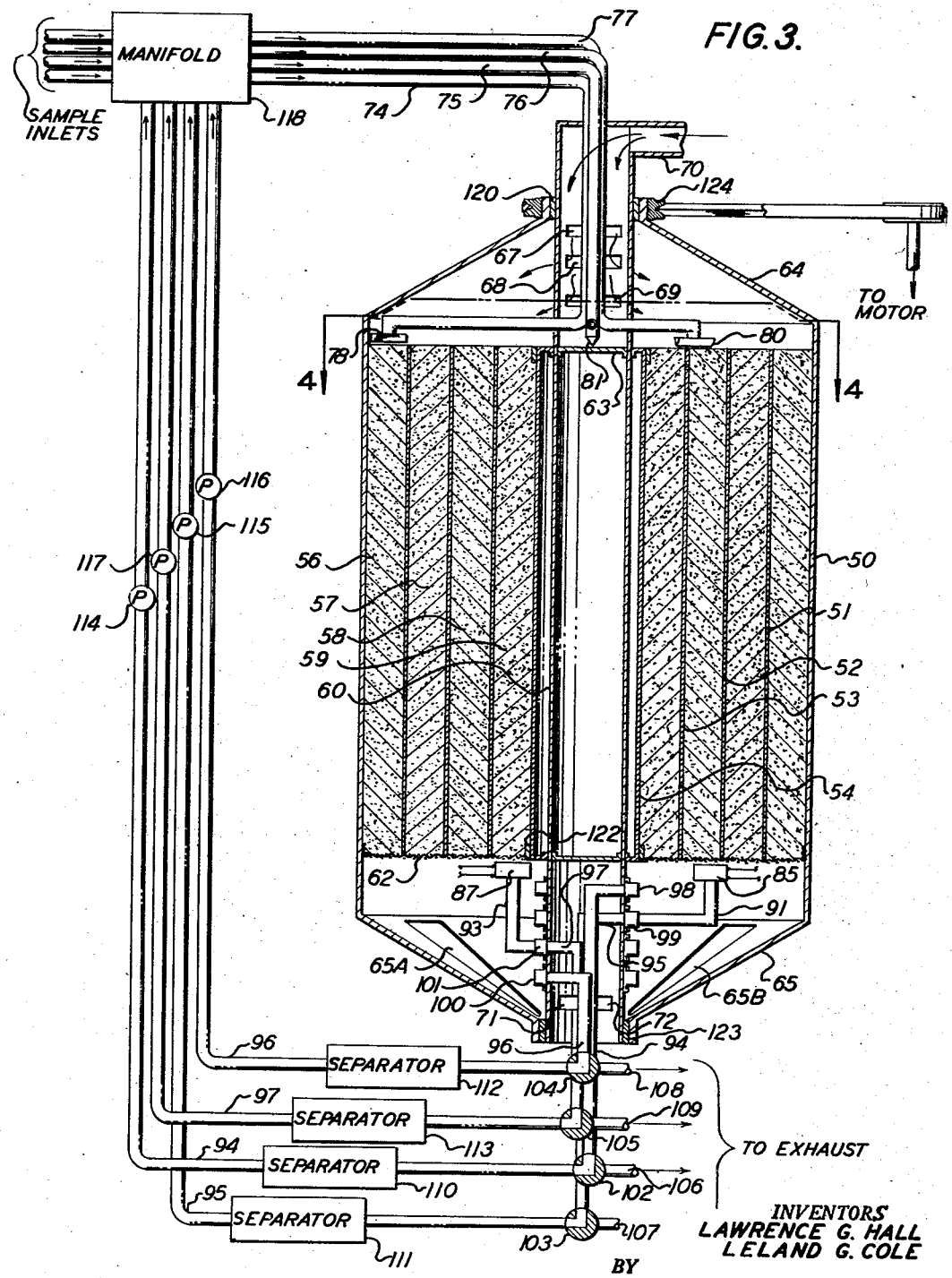
Fig. 3 is a vertical sectional elevation showing a multi-chambered system in accordance with the invention.

A somewhat more elaborate embodiment of the invention is shown in Figs. 3 and 4, this embodiment being particularly suited for multi-stage separation or for multiple monitoring of related samples, i.e. more than one sample entering. This device has a cylindrical housing 50 and a series of inner tubes of progressively smaller diameter 51, 52, 53, 54, concentrically mounted within the housing to form a series of annular chambers 56, 57, 58, 59, also of progressively smaller diameter. The several inner tubes and an additional tube 60 are supported within the housing from a plate 62 disposed transversely across the housing adjacent its bottom end, the plate 62 being perforate in the region below the several annular chambers and imperforate inwardly therefrom. The upper ends of the tubes 54 and 60 are also sealed by a plate 63 so that any gas flow through the housing must be through the annular chambers. The movable housing is provided at top and bottom with frusto-conical closures 64, 65, respectively, the bottom closure having a number of access ports of which ports 65A, 65B are apparent in the section view.

The tube 60 extends upwardly from the plate 63 through the top of the top closure 64 and downwardly from the plate 62 through the bottom of the bottom closure 65, the upper and lower extensions of the tube 60 furnishing means for introduction and discharge of carrier gas respectively into the housing and as a conduit for sample inlet and outlet lines. For this purpose the upper extension of the central tube 60 is provided with ports 67, 68, 69 through which carrier gas introduced at an inlet 70 is discharged into the upper closure 64. Carrier gas flowing through the housing may be exhausted through ports 65A, 65B, etc. to which suitable collection means (not shown) may be connected. Alternatively, closure means may be provided for these ports and the carrier gas collected in the lower end of the tube 60 by flow through ports 71, 72 therein and out the lower end of the tube. A series of sample inlet tubes 74, 75, 76 and 77 are carried through the top of the upper extension of tube 60 into the closure 64 and from thence radially outwardly from the tube 60 to terminate in sample inlet nozzles 78, 79, 80, 81, respectively positioned to introduce sample to the annular chambers 56, 57, 58, and 59. The several annular chambers are packed with suitable packing for chromatographic separation, it being apparent that different packings are conveniently used in each chamber when so desired.

A series of collectors 84, 85, 86 and 87 are disposed in the lower portion of the housing respectively to receive a portion of the gas flowing through the chambers 56, 57, 58 and 59, the collectors in turn being connected to intermediate lines 90, 91, 92, 93, respectively.

The lower portion of the central column 60 carries a plurality of recycle lines 94, 95, 96, 97 opening through a wall of the column respectively into a number of longitudinally spaced annular collecting rings 98, 99, 100 and 101 rotatably sealed to the external circumference of the column. The intermediate tubes 90, 91, 92 and 93 from the several collectors are respectively connected into these annular collector rings. By means of this construction the several detectors 84, 85, 86 and 87 are respectively connected into recycle lines 94, 95, 96 and 97 and yet each detector may be independently rotated about the axis of the system by reason of the rotating ring seals. This permits movement of the detectors to scan the effluent from the respective column. At the same time, the ring seals are made sufficiently resistant to rotation that, undisturbed, the detectors will remain in a fixed position relative to column 60 and hence in a fixed angular position relative to the respective inlets. Recycle lines 94, 95, 96 and 97 are each provided with the three-way valves 102, 103, 104 and 105 respectively, whereby the gas flowing through these lines may be recycled through extensions of lines 94, 95, 96 and 97, or may be collected or discharged through exhaust lines 106, 107, 108, 109 respectively. A separator is disposed in each recycle line, these being indicated schematically respectively at 110, 111, 112 and 113, as above explained, for the purpose of separating the carrier gas from the components of interest so that only the latter are recycled in the system. Suitable pumps 114, 115, 116 and 117, respectively, are provided in each of the recycle lines to repressure that portion of the sample being recycled, which is necessary as a consequence of the pressure drop occurring through the column. A manifold 118 is shown forming a junction between the several recycle lines and the sample inlet lines. The manifold is a conventional collection of valves and by-passes which permits individual interconnection of the several recycle and sample lines in the many possible combinations, so that any desired recycle pattern is achievable.

The housing 50 is rotatably mounted about the central tube 60, suitable journal bearings 120, 121, 122 and 123 being shown for this purpose, and mechanical drive means 124 are provided for rotating the housing about the tube. This accomplishes rotation of the several annular chambers relative to the fixed points of sample feed.

The several detectors may be independently rotated about the column 60 by automatic or manual manipulation to scan the spectrum of the respective columns at a rate determined by the rate of rotation and dictated by sensitivity requirements. Each detector may be separately scanned and, when desired, adjusted to a given angular position relative to its respective inlet to monitor a given component of the sample. As in the foregoing embodiment more than one collector may be arranged to sense on gas flow through any one or all of the columns. Also, the detectors may be arcuate in nature and of any desired angular inclusion to pick up any predetermined separated fraction.

Different samples may be separately and independently analyzed in each of the several annular chambers, the term "analyzed" in this sense indicating either bulk separation or quantitative analytical separation. Even in the event of such separate and independent utilization of the several annular chambers, a single stream of carrier gas is introduced through inlet 70 into the top closure 64 so that it flows simultaneously into the entire top annular surface of the packing in each of the annular chambers, space velocity being maintained such that there is substantially no lateral diffusion of sample gas at the inlet nozzles or within the packed beds. In the event of such application the valves 102, 103, 104 and 105 are set to block off the recycle lines 94, 95, 96 and 97, and the fractions collected in the several collectors and exhausted at 106, 107, 108 and 109 may be handled in any desired fashion.

However, one of the principal features of the apparatus as shown in Fig. 3 is the facility with which precise and relatively large scale separations can be accomplished by a recycling procedure. In such application a total sample may be introduced to a given chamber which, for purposes of discussion, may be assumed to be the outer chamber 56, a desired fraction thereof collected, separated from the carrier gas, and recycled with new carrier gas through a second chamber, for example chamber 57, further fractionation being possible by additional recycle through chambers 58 and 59, the ultimate fraction discharged from chamber 59 being the pure or substantially pure component sought. The concentric annular chambers adapt themselves peculiarly to such application not only by reason of the continuous operation that is made possible by the construction, but also by reason of the fact that the volumes thereof decrease proportionately with a decrease in diameter as does the volume of the fraction to be separated as fractionation progresses.

As an example of a practical operating unit of the type shown in Fig. 3, the overall diameter of the housing 50 may be about 4 inches, its length about 6 inches, the sample inlet lines 74, 75, etc. may be approximately ⅛ inch in diameter, carrier gas may be introduced at about 30 pounds pressure to achieve a space velocity of somewhere between about 15 to 60 cubic centimeters per minute per square centimeter of the annular column's cross-sectional area.

These figures represent one typical unit in terms of dimensions, flow rates and the like and are in no way to be construed as limitations on the dimensions or operating parameters of the apparatus. The apparatus may be operated under higher or lower pressures, provided that the limitation imposed on the rate of carrier gas flow is adhered to.

We claim:

1. A gas chromatograph comprising a cylindrical housing, an inner tube of smaller diameter mounted concentrically within the housing to form an annular chamber therein, perforate means enclosing the lower end of the annular chamber, chromatographic packing disposed in the annular chamber, sample inlet means opening at a point on the upper surface of the packing, means for introducing an elutant into the entire annular chamber at such a rate as to substantially prevent lateral diffusion of the sample, detector means adjustably positioned beneath the perforate closure, and means for causing continuous relative coaxial displacement of the sample inlet and the annular chamber.

2. A gas chromatograph comprising a cylindrical housing, an inner tube of smaller diameter mounted concentrically within the housing to form an annular chamber therein, perforate means enclosing the lower end of the annular chamber, chromatographic packing disposed in the annular chamber, sample inlet means opening at a point on the upper surface of the packing, means for introducing an elutant into the entire annular chamber at such a rate as to substantially prevent lateral diffusion of the sample, detector means adjustably positioned beneath the perforate closure, means for causing continuous relative coaxial displacement of the sample inlet and the annular chamber, and means for independently rotating the detector means about the annular discharge end of the column.

3. A gas chromatograph comprising a cylindrical housing, an inner tube of smaller diameter mounted concentrically within the housing to form an annular chamber therein, perforate means enclosing the lower end of the annular chamber, chromatographic packing disposed in the annular chamber, sample inlet means opening at a point on the upper surface of the packing, means for introducing an elutant into the entire annular chamber at such a rate as to substantially prevent lateral diffusion of the sample, detector means adjustably positioned beneath the perforate closure, means for fixing and maintaining the angular relation of the sample inlet and the detector, and means for causing continuous relative coaxial displacement of the sample inlet and the annular chamber.

4. A gas chromatograph comprising a cylindrical housing, closure means at opposite ends of the housing, an inner tube of smaller diameter mounted concentrically within the housing to form an annular chamber therein, perforate means enclosing the lower end of the annular chamber, chromatographic packing disposed in the annular chamber, sample inlet means carried through the upper closure and opening at a point on the upper surface of the packing, means for introducing an elutant into the upper closure for simultaneous flow into the entire annular chamber at such a rate as to substantially prevent lateral diffusion of the sample, detector means adjustably positioned beneath the perforate closure, means for fixing and maintaining the angular relation of the sample inlet and the detector, and means for causing continuous relative coaxial displacement of the sample inlet and the annular chamber.

5. A gas chromatograph comprising a cylindrical housing, closure means at opposite ends of the housing, an inner tube of smaller diameter mounted concentrically within the housing to form an annular chamber therein, perforate means enclosing the lower end of the annular chamber, chromatographic packing disposed in the annular chamber, sample inlet means carried through the upper closure and opening at a point on the upper surface of the packing, means for introducing an elutant into the upper closure for simultaneous flow into the entire annular chamber at such a rate as to substantially prevent lateral flow of the sample, detector means adjustably positioned beneath the perforate closure, means for independently rotating the detector, means to scan the discharge end of the column, means for fixing and maintaining the angular relation of the sample inlet and the detector, and means for causing continuous relative coaxial displacement of the sample inlet and the annular chamber.

6. A gas chromatograph comprising a cylindrical housing, a plurality of inner tubes of differing diameters mounted concentrically within the housing to form a plurality of annular chambers of varying diameters, chromatographic packing material disposed in each of the chambers, separate sample inlet means positioned to separately introduce sample material to the several chambers, means for introducing elutant to flow through the several chambers at a rate precluding radial migration of the sample, separate pickup means disposed beneath each chamber, and means for causing relative rotation between the columns and the sample inlet means.

7. A gas chromatograph comprising a cylindrical housing, a plurality of inner tubes of differing diameters mounted concentrically within the housing to form a plurality of annular chambers of varying diameters, chromatographic packing material disposed in each of the chambers, separate sample inlet means positioned to separately introduce sample material to the several chambers, means for introducing elutant to flow through the chambers at a rate precluding substantial lateral diffusion, separate pickup means disposed beneath each chamber at an adjustable fixed angle with respect to the respective sample inlet, and means for rotating the columns and inlet means relative to each other.

8. A gas chromatograph comprising a cylindrical housing, a plurality of inner tubes of differing diameters mounted concentrically within the housing to form a plurality of annular chambers of varying diameters, chromatographic packing material disposed in each of the chambers, separate sample inlet means positioned to separately introduce sample material to the several chambers, means for introducing elutant to flow through the chambers at a rate precluding radial migration of the sample above the chambers and substantial lateral diffusion in the chambers, separate pickup means disposed beneath each chamber at an adjustable fixed angle with respect to the respective sample inlet, means for causing relative rotation between the columns and the sample inlet means, and means for recycling gas from each pickup means into any one of the several sample inlet means.

9. A gas chromatograph comprising a cylindrical housing, closure means at opposite ends of the housing, a plurality of inner tubes of differing diameters mounted concentrically within the housing to form a plurality of annular chambers of varying diameters, chromatographic packing material disposed in each of the chambers, perforate closure means in each chamber retaining the packing therein, separate sample inlet means carried through the upper closure and positioned to separately introduce sample material to the several chambers, means for introducing elutant to the upper closure in such volume as to flow through the chambers at a rate precluding radial migration of the sample above the chambers and substantial lateral diffusion within the chambers, separate pickup means adjustably disposed beneath each chamber, means for rotating the several pickup means to scan the outlet ends of the respective columns, means for fixing the pickup means at an adjustable fixed angle with respect to the respective sample inlet, means for rotating the columns and sample inlets relative to each other, and means for recycling gas from each pickup means into any one of the several sample inlet means.

10. A gas chromatograph comprising a cylindrical housing, closure means at opposite ends of the housing, a plurality of inner tubes of differing diameters mounted concentrically within the housing to form a plurality of annular chambers of varying diameters, chromatographic packing material disposed in each of the chambers, perforate closure means retaining the packing in the chambers, separate sample inlet means carried through the upper closure and positioned to separately introduce sample material to the several chambers, means for introducing elutant to the upper closure in such volume as to flow through the chambers at a rate precluding radial migration of the sample above the chambers, separate pickup means adjustably disposed beneath each chamber, means for causing relative rotation between the chambers and sample inlets, means for recycling gas from each pickup means into any one of the several sample inlet means, and means in the recycle means for separating sample components from elutant.

11. A gas chromatograph for separating at least one component from a sample mixture which comprises means forming an annular chromatographic column, an inert packing material disposed in the annular column, means for introducing the sample mixture as a gas to a restricted area of the annular surface of the packing, means for introducing a carrier gas simultaneously into the entire annular surface of the packing and for maintaining the space velocity of the carrier gas in the packing above that at which appreciable lateral flow of the sample can take place within the packing, means for separately collecting gas fractions emerging together with the carrier gas from differernt regions at the opposite end of the column packing from said surface, and means for causing continuous relative rotation between the sample inlet and the column.

References Cited in the file of this patent

UNITED STATES PATENTS 2,398,818     Turner _____ Apr. 23, 1946

UNITED STATES PATENT OFFICE

CERTIFICATE OF CORRECTION

Patent No. 2,891,630                          June 23, 1959

Lawrence G. Hall et al.

It is hereby certified that error appears in the printed specification of the above numbered patent requiring correction and that the said Letters Patent should read as corrected below.

Column 1, line 31, for "frictional" read -- fractional --; column 10, line 44, for "diffeernt" read -- different --.

Signed and sealed this 8th day of December 1959.

(SEAL)
Attest:

KARL H. AXLINE
Attesting Officer

ROBERT C. WATSON
Commissioner of Patents